United States Patent
Haslam

(10) Patent No.: US 9,480,924 B2
(45) Date of Patent: Nov. 1, 2016

(54) RULES BASED SYSTEM FOR MANAGING USER SELECTIONS IN CUSTOMIZABLE OBJECTS

(75) Inventor: David Haslam, Salt Lake City, UT (US)

(73) Assignee: Disney Enterprise, Inc., Burbank, CA (US)

( * ) Notice: Subject to any disclaimer, the term of this patent is extended or adjusted under 35 U.S.C. 154(b) by 1172 days.

(21) Appl. No.: 12/954,261

(22) Filed: Nov. 24, 2010

(65) Prior Publication Data

US 2012/0129584 A1    May 24, 2012

(51) Int. Cl.
*A63F 9/24* (2006.01)
*A63F 13/63* (2014.01)
*A63F 13/85* (2014.01)

(52) U.S. Cl.
CPC ............... *A63F 13/63* (2014.09); *A63F 13/85* (2014.09); *A63F 2300/5553* (2013.01); *A63F 2300/6018* (2013.01); *A63F 2300/65* (2013.01); *A63F 2300/807* (2013.01)

(58) Field of Classification Search
CPC ............ A63F 13/85; A63F 2300/206; A63F 2300/407; A63F 2300/5553; A63F 2300/65; A63F 13/63; A63F 2300/6018; A63F 2300/807

USPC ...................................................... 463/30–34
See application file for complete search history.

(56) References Cited

U.S. PATENT DOCUMENTS

2005/0143174 A1*  6/2005  Goldman et al. ............... 463/42
2010/0056273 A1*  3/2010  Reville et al. .................. 463/31

OTHER PUBLICATIONS

"Second Life Forums Archive—Hair", Nov. 2008, Second Life, < http://forums-archive.secondlife.com/327/a0/293322/1.html>.*
Dressing Room, Patch 1.7.0 Sep. 22, 2005, WoWWiki, < http://www.wowwiki.com/Dressing_room>.*
Dave Spohn, Lord of the Rings Online Beta Impressions, Mar. 6, 2007, <http://internetgames.about.com/od/mmorpgs/a/lotronline.htm>.*
Avatar Hair Introduction, Mar. 7, 2008, <http://avatars.imvu.com/shop/includes/iframe_product_description.php?products_id=2220917>.*

* cited by examiner

*Primary Examiner* — Justin Myhr
(74) *Attorney, Agent, or Firm* — Patterson + Sheridan, LLP

(57) ABSTRACT

A rules-based system which processes user selections to determine what content is actually loaded and used for a given object model in video games or other online or interactive digital environments. The disclosed rules-based system also allows for rules exceptions, which support the prioritization of the user's most recent selections over the rules.

27 Claims, 6 Drawing Sheets

1

RULES BASED SYSTEM FOR MANAGING USER SELECTIONS IN CUSTOMIZABLE OBJECTS

BACKGROUND

1. Field

Embodiments of the invention generally relate to techniques which allow users to customize characters in an interactive environment. More specifically, embodiments of the invention provide a rules-based system for managing user selections in customizable characters.

2. Description of the Related Art

Typically, computer game systems include a console that reads computer game code from a storage device (e.g., a CD-ROM disc or storage drive) and transmits video to a television screen for display. Computer game systems also include controllers that allow users to manipulate the characters, vehicles, buildings or other objects of the game. Similarly, users may install game software on a desktop computing system, allowing user to control a game using a keyboard and mouse (or other controller). Of course, video games are also widely available for a variety of other computing platforms; including, e.g., handheld devices, tablet computers, mobile telephones, etc. In addition to "games," a variety of online environments allow users to interact with one another in different virtual settings.

Generally, developers of games and online environments create a computer-rendered world in which the game characters, vehicles, or other features interact with one another. For example, computer games allow a player to control an avatar through a virtual environment to accomplish a set of game-related tasks or challenges. Both games and virtual environments frequently allow users to customize the appearance of a character. For example, users might be able to create and customize the clothing, size, gender, shape, and other aspects of character appearance or behavior. To prevent rendering problems, however, such customizations may be subject to constraints. To address this issue, developers may include hard-coded constraints to modify certain combinations of character customization.

SUMMARY

One embodiment of the invention provides a method for customizing the appearance of a digital object. This method may generally include receiving a modification to a then current model definition for the digital object. Upon determining the then current model definition satisfies at least one exclude override rule, a copy of the then current model definition is modified as specified by the exclude override rule, without also modifying the then current model definition. This method also includes generating a display of the digital object from the modified copy of the then current model definition.

Still another embodiment of the invention includes a computer-readable storage medium storing code for execution by a central processing unit (CPU), wherein the code, when executed by the CPU, performs an operation for customizing the appearance of a digital object. The operation may generally include receiving a modification to a then current model definition for the digital object. Upon determining the then current model definition satisfies at least one exclude override rule, a copy of the then current model definition is modified as specified by the exclude override rule, without also modifying the then current model definition. This operation may also include generating a display of the digital object from the modified copy of the then current model definition.

Still another embodiment includes a system having one or more computer processors and a memory containing a program, which when executed by the one or more computer processors is configured to perform an operation for customizing the appearance of a digital object. The operation itself may generally include receiving a modification to a then current model definition for the digital object. Upon determining the then current model definition satisfies at least one exclude override rule, a copy of the then current model definition is modified as specified by the exclude override rule, without also modifying the then current model definition. This operation may also include generating a display of the digital object from the modified copy of the then current model definition.

Yet another embodiment of the invention includes a method for customizing a object in a video game system. The method may generally include receiving a first set of object attributes and receiving a set of rules. The rules are configured to maintain a predefined object aesthetic. This method may also include receiving a set of wildcards. The wildcards are configured responsive to the rules to generate at least one object customization combination that maintains the object aesthetic. This method may also include receiving a user's selection of object attributes for a target object configuration. In response to the user selection, the user selection may be revised with at least one of the rules and one of the wildcards to derive a second set of object attributes from the first set of object attributes. In particular, the second set of object attributes maintains the predefined object aesthetic within a predefined threshold while approximating the user target object configuration.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
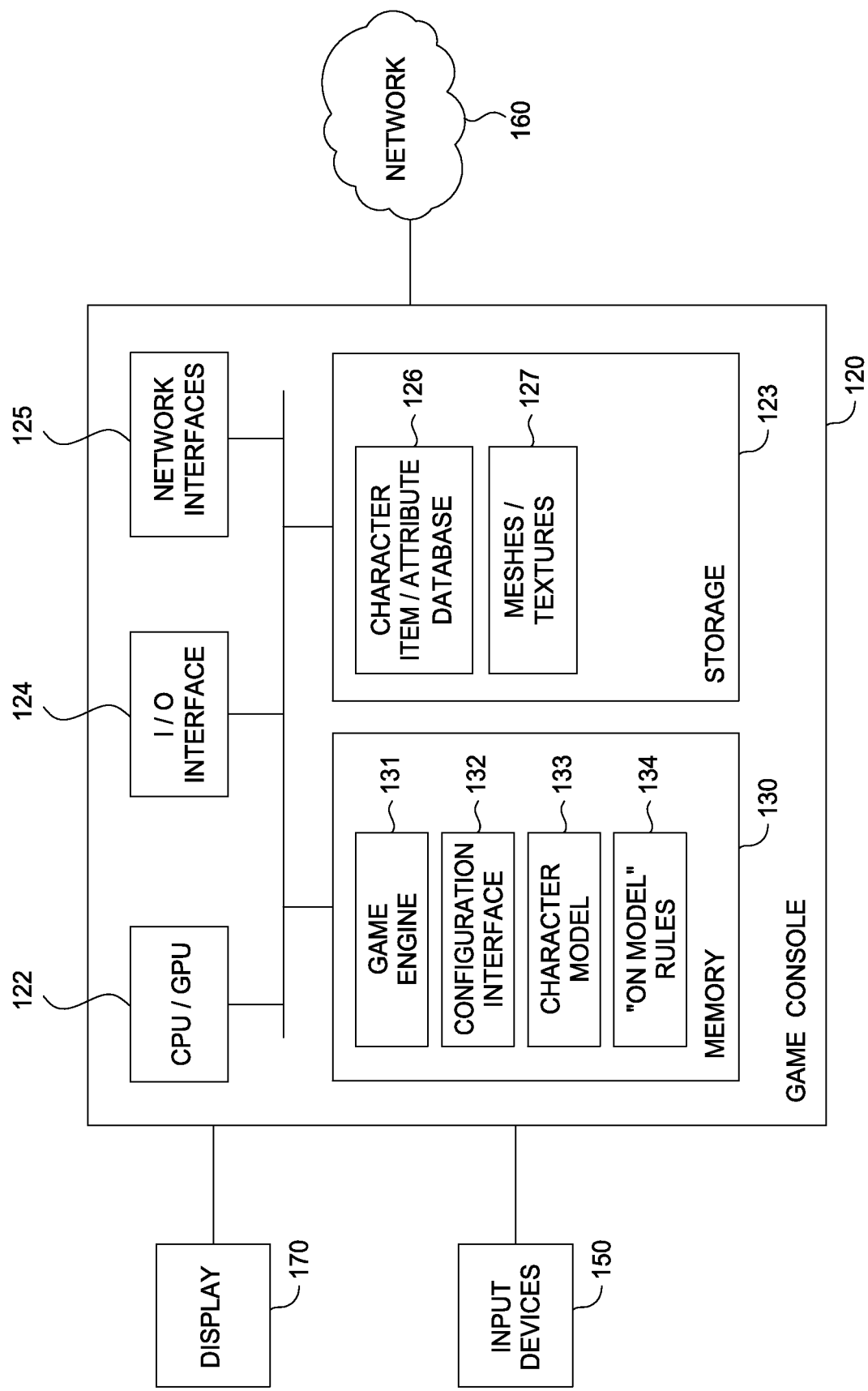
FIG. 1 illustrates an example of a gaming console, according to one embodiment of the invention.

Embodiments of the invention generally provide a rules-based system for managing user-selections of object customization options in video games (or other interactive environments). When allowing users to customize objects in a game, it is difficult to ensure that the user-selected items will work together well without interpenetration or other rendering artifacts. Additionally, some possible customization choices may simply be incompatible from a game-play perspective. Embodiments of the invention provide a method for managing these complexities. In particular, embodiments of the invention allow a user to customize an object while providing a framework to keep the object "on-model," where "on-model" refers to how an object was designed by the creating artist with a certain look, personality and/or character specific traits. Thus, embodiments of the invention allow the user to generally make whatever choice in customizations to an object model they desire, while allowing the system to ensure a certain level of desired aesthetic appeal to the customized object models.

To allow for both the player to have the maximum control available and to support the system to favor user choices over system enforced substitutions, embodiments of the invention provide a rules-based system which processes the user selections to determine what content is actually loaded and used for a given object model. This system also allows for rules exceptions, which support the prioritization of the user's most recent selections over the rules.

Thus, embodiments of the invention allows a user to customize an object while both maintaining the object's look and on-model traits and also honoring the user's choices as closely as possible. In one embodiment, if a user changes the object model, the system uses previous selections of the user to reconfigure the object so that the object remains on-model. The system uses rules and wildcards to allow a broad range of combinations, thus giving the user considerably more choice than would be possible otherwise. Doing so provides a much more user friendly and programmer friendly approach to object customizations. Further, due to the rule based and wildcard aspects, the user's previous selections are not discarded, but are used to help maintain the user's original choices in a consistent manner.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, embodiments are generally described herein relative to a gaming console executing a video game program which allows fur user customizations of a character model. However, one of ordinary skill in the art will recognize that embodiments of the invention may be adapted for a broad variety of software applications which allow users to customize the appearance of a character. For example, in addition to video games, embodiments may be adapted for interactive on-line environments, massive multi-player gaming systems, virtual worlds, etc. Further still, one of ordinary skill in the art will recognize that embodiments of the invention may also be adapted for a variety of game console devices, desktop, laptop, and tablet computers as well as mobile telephones and handheld devices, and the like. Additionally, for purposes of illustration, embodiments are described herein relative to customizing a character (which may or may not be an avatar under direct control of a user via a controller). However, more generally, any object can be customized including avatars, vehicles, buildings and other environment features.

FIG. 1 illustrates an example of a gaming console 120, according to one embodiment of the invention. As shown, the game console includes a CPU/GPU 122, an I/O interface 124, a network interface 125, a memory 130, and storage 123. Additionally, the gaming console is connected to input devices 150, network 160, and a display 170. The character customization process may be viewed on the display device 170, such as an LCD, LED or CRT monitor display, and controlled using input devices 150 which may be, e.g., a keyboard, mouse and/or a controller.

CPU/GPU 122 is a programmable logic device that executes instructions, logic and mathematical processing, and may be representative of one or more CPUs multi-core CPUs, and/or GPUs, and the like. The memory 130 represents any memory sufficiently large to hold the necessary programs and data structures while executing a given video game (represented in FIG. 1 as game engine 131). Memory 130 could be one or a combination of memory devices, including Random Access Memory (e.g., DRAM modules), nonvolatile or backup memory (e.g., programmable or Flash memories, read-only memories, etc.). Storage 123 stores application programs and data for use by game console 120. Storage 123 is included to be representative of hard-disk drives, solid-state drives (SSD), flash memory devices, optical media (e.g., CD/DVD/Blu-Ray® discs) and the like.

As shown, the memory 130 includes the game engine 131, a configuration interface 132, a character model 133 and "on-model" rules 134. And the storage 123 includes a character item/attribute database 126 and meshes/textures 127.

The game engine 131 provides a software application providing a given video game (or client for an interactive online environment). In one embodiment, the game engine 131 includes a configuration interface 132 which allows a user to specify customization choices for a character model 133. For example, assume the game engine 131 provides a first-person shooter game, where characters compete with other users. In such a case, the game engine 131 could support a variety of different choices for the appearance of a human-like character (e.g., size, age, physical features, clothing, uniforms, tattoos, jewelry, etc.). Of course, the available customization options will depend on the particular game, character, or interactive environment.

In one embodiment, the available character customization choices stored in the character/item attribute database 126. In addition, items in the item/attribute database may be associated with different rendering assets (e.g., meshes/textures 127). The user customization choices are stored as character model 133. For example, assume a user selects a military jacket with a particular set of insignia. This selection of this item for a given character is stored as part of the character model 133. Note, however, the customization may include non-visual aspects of a character. For example, some games allow users to specify a character class (e.g., a barbarian versus a wizard) as well as other attributes (e.g., by allowing a user to assign a number of skill points to categories such as strength, intelligence, agility, etc.). Of course, the non-visual character customization choices will vary from game to game. These choices may also be stored as part of a character model 133.

As noted, not all of the possible character customization choices may result in a feasible character model 133, e.g., some combinations may result in interpenetration artifacts during character rendering. As a simple example, assume a user selects a large, spiky hair style for a human character. Such a hair style may be incompatible with the same character wearing a hat, as elements of the spiky hair could be rendered as penetrating through the hat if both elements are left as part of the character model 133. Accordingly, the on-model rules 134 may prevent a character from combining the spiky hair style with hats. Similarly, in some cases a given character item may have different versions, where the meshes/textures 127 used to render that item may depend to other choices made by the user. For example, assume a user is customizing the appearance of a female character wearing a shirt. Different versions of the shirt may be provided, depending on whether the character is wearing pants or a skirt.

In one embodiment, on-model rules 134 are applied once a user customization is complete to arrive at a final set of rendering assets (e.g., meshes/textures 127) to use in rendering a character model 133. However, on-model rules 134 may also include rules applied during the character customization process to modify the items included in character model 133, referred to as "exclude override rules." In such a case, the exclude override rules are applied to modify the character model 133, without changing the actual user selections stored in the character model 133. Doing so allows the user to customize character model 133, without losing customization choices along the way. Returning to the example of a hat and spiky hair, when the user selects a hat, applying the exclude override rule may replace the spiky hair with a default (hat-compatible) hair style in rendering the character, allowing the user to preview the appearance of the hat on the character. However, the spiky hair is left as one of the items in the character model 133. Thus, if the user removes the hat, the spiky hair returns. Doing so gives preference to the most recent user choices during character customization. In contrast, when the user is done customizing the character model 133, the configuration rules may modify the character model to remove the spiky hair form the model. That is, in this example, the final set of rendering assets for a character model would not include the spiky hair.

Additionally, as described in greater detail below, the on-model rules 134 may be specified using wildcards, resulting in a rule being applicable to a set of more than one customization choices. Doing so prevents the need for individual one-off rules for each possible combination of items. For example, rather than have the rule changing the hair when a user selects to add a hat to a character, as applied only to the hairstyle of "spiky," the rule could be applied to all hairstyles tagged as "large." Accordingly, the items in the character item/attribute database 126 may be tagged with metadata used as wildcards for different on-model rules 134.

Figure 2:
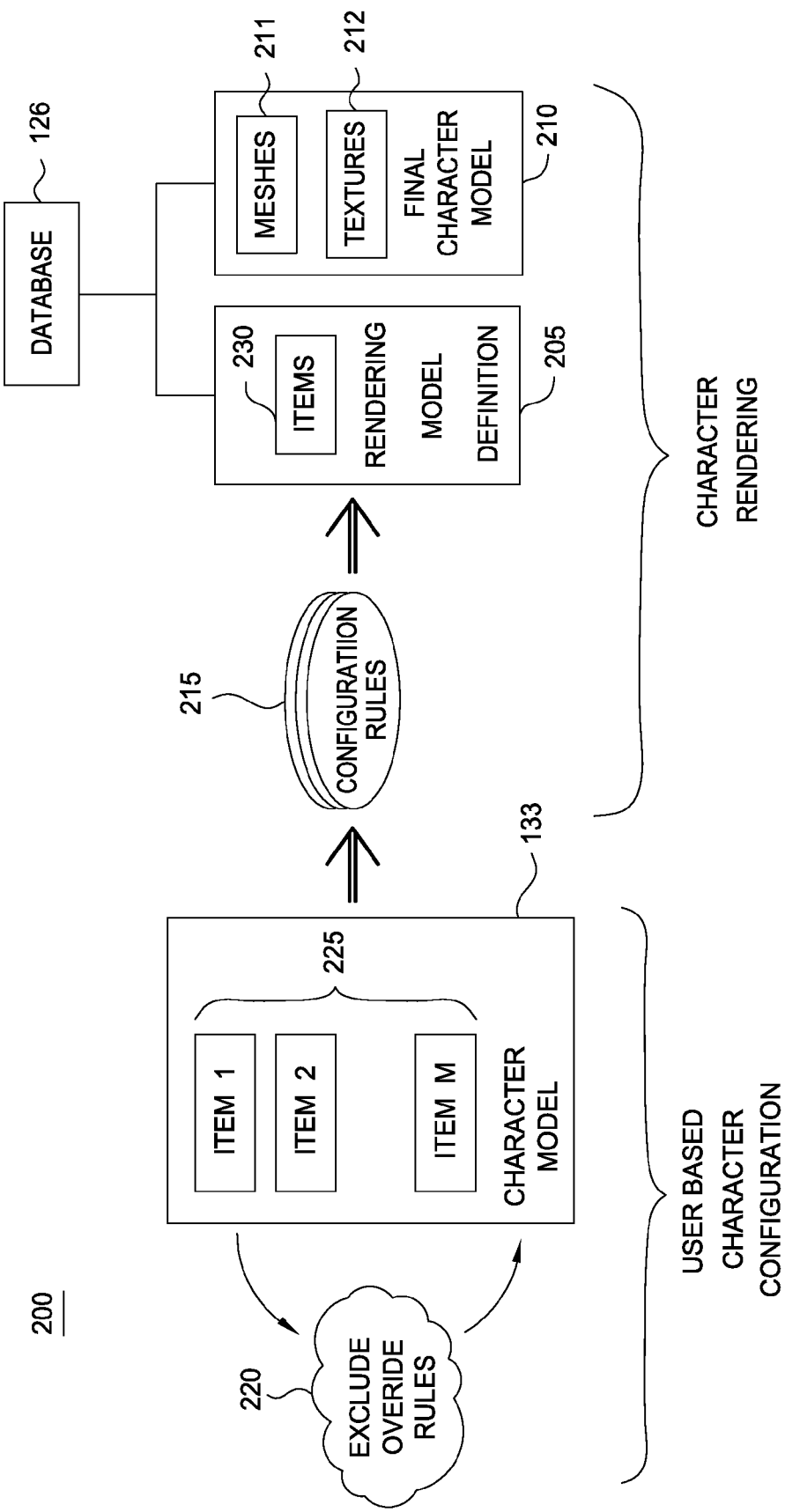
FIG. 2 illustrates an example of a rules based system for managing user selections of customizable characters in interactive environments, according to one embodiment of the invention.

FIG. 2 illustrates an example of a rules based system 200 for managing user selections of customizable characters in interactive environments, according to one embodiment of the invention. As shown, a user customizes a user-based character configuration (i.e., character model 133). Thus, the character model 133 identifies a set of items 225 selected by a user to include as part of character model 133. For example, the items 225 could include the physical attributes (e.g., hair styles) and clothing (e.g., a uniform) defining character appearance.

In one embodiment, each time the user adds, removes, or modifies one of the items 225, the exclude override rules 220 are applied to the character model 133. During the character customization process, the exclude override rules 220 may change the appearance of a character, without modifying the user-specified items 225 included in the character model 133. Instead, each time a modification is made to the character model 133, the exclude override rules 220 are applied. For example, when a user adds the spiky hair to their character model, a configuration rule 215 would be used to exclude the hat from being included in character model while the user is configuring their character. The exclude override rules 220 essentially override this from occurring by modifying a copy of the character model, without also modifying the character model itself. Thus, the hat remains in the model definition during character configuration, but is not rendered as part of the model.

Once a user is completed customizing the character model 133, configuration rules 215 may be applied to the character model 133 to generate a final rendering model definition 205. More specifically, the rendering model definition 205 includes a set of items 230 for a final character configuration. Continuing with the example from above, the configuration rule would remove the hat from a model with spiky hair. The appropriate set of meshes 211 and textures 212 (and/or other rendering assets) may then be retrieved from the database 126 and stored as the final character model 210.

Figure 3:
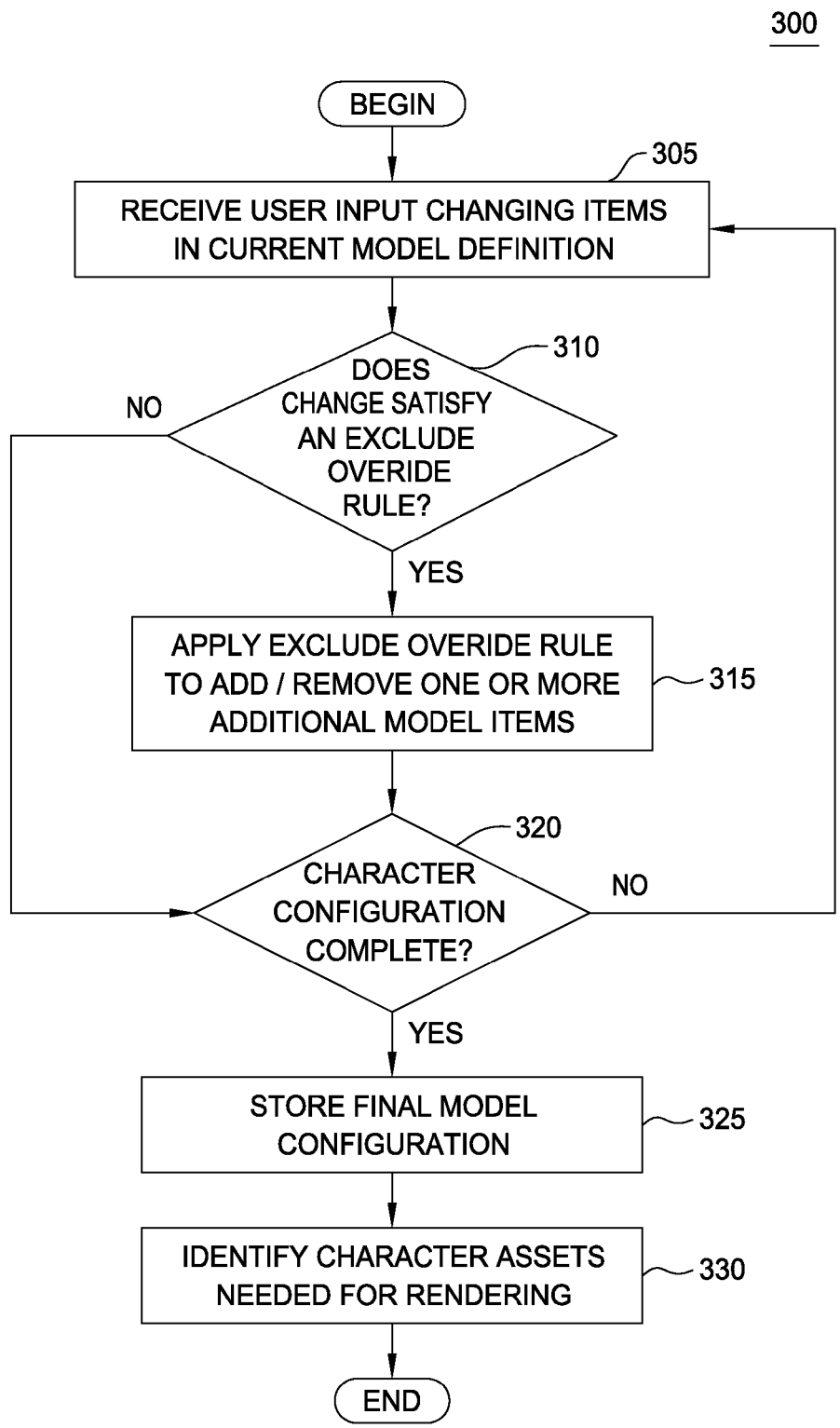
FIG. 3 illustrates a method for applying a rules-based system to manage user selections in customizable characters, according to one embodiment of the invention.

FIG. 3 illustrates a method 300 for applying a rules-based system to manage user selections in customizable characters, according to one embodiment of the invention. As shown, the method begins at step 305, where the game engine receives user input changing items in a current model definition for an in-game character. For example, the user could change the clothing, clothing colors, clothing styles, physical attributes, or a variety of other aspects of character appearance (as well as non-visual aspects of a character).

At step 310, the game engine may determine whether the change specified at step 305 satisfies conditions of an exclude override rule. The condition may be related to the addition (or removal) of a specific item (e.g., the spiky hair), but may also be associated with a wildcard, referencing metadata tags for a group of items (e.g., any hair style tagged as "large"). As noted above, the exclude override rule may modify the items of the character presented to the user without actually removing (or adding) items to the formal model definition. If the change satisfies conditions of an exclude override rule, then at step 315, the game engine applies the exclude override rule to add or remove (or both) one or more additional model items from the display of the character being customized.

Following step 315 (or the no branch of step 310), the user may specify whether the character customization process is complete (step 320). If not, then the method 300 returns to step 305 where the user specifies additional character customizations and the exclude override rules are again applied to each customization. Once the character configuration is complete (the yes branch of step 320), the game engine 131 may store the final character model configuration (step 325). Note, the final character model configuration (step 325) includes the actual item choices specified in the character model, not the changes made to the mode by the exclude override rules. Thus, while the exclude override rule may remove the spiky hair, replace it with a default hair style in response to the user adding a hat to a character model, the model itself retains the spiky hair style.

In contrast, the game engine 131 may apply the configuration rules to the final model configuration (step 325), resulting in actual changes to the items in the character model (e.g., actually removing the spiky hair and replacing it with the default hair style response to the user adding a hat to the character model). Once the final items in the model are determined, at step 320 325, the game engine identifies the textures, polygonal meshes, and assets needed for rendering at step 330.

Figure 4:
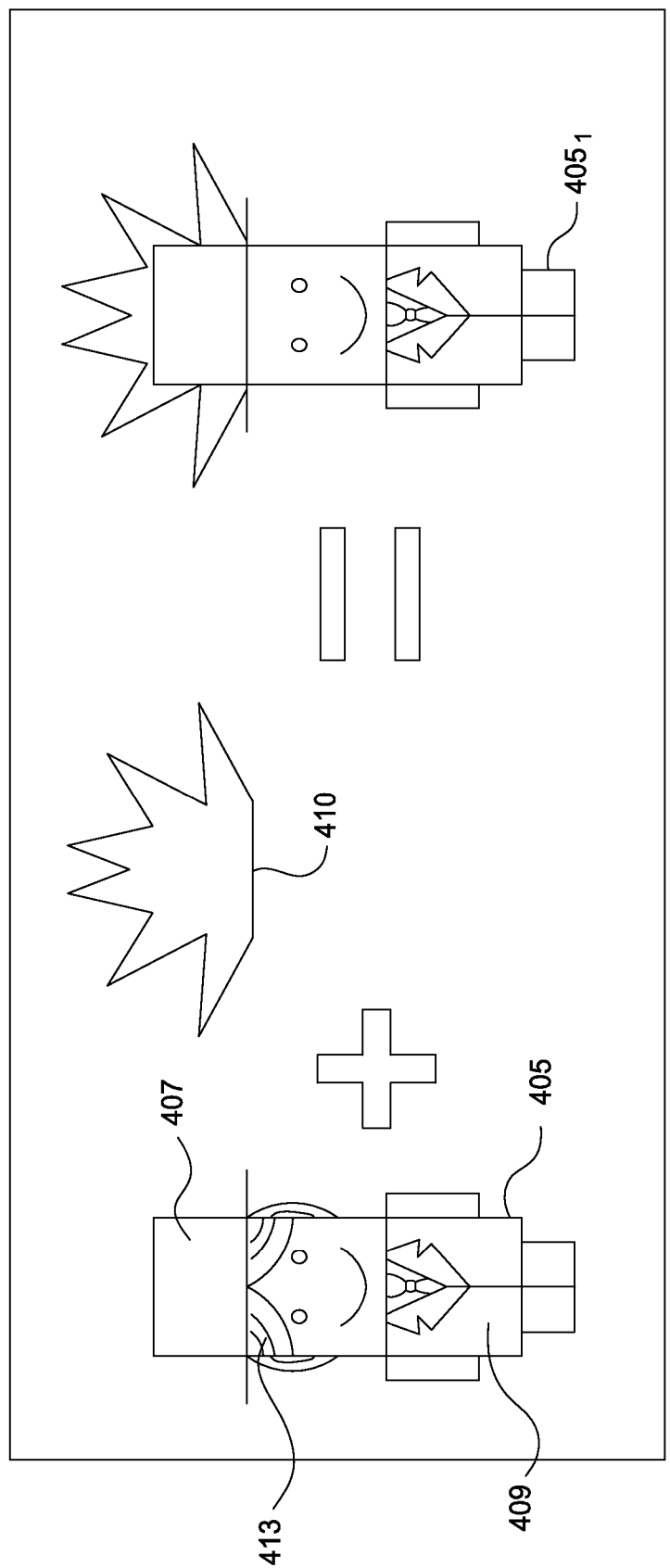
FIG. 4-6 illustrates an example of exclude override rules applied to user selections in customizable characters, according to one embodiment of the invention.
Figure 5:
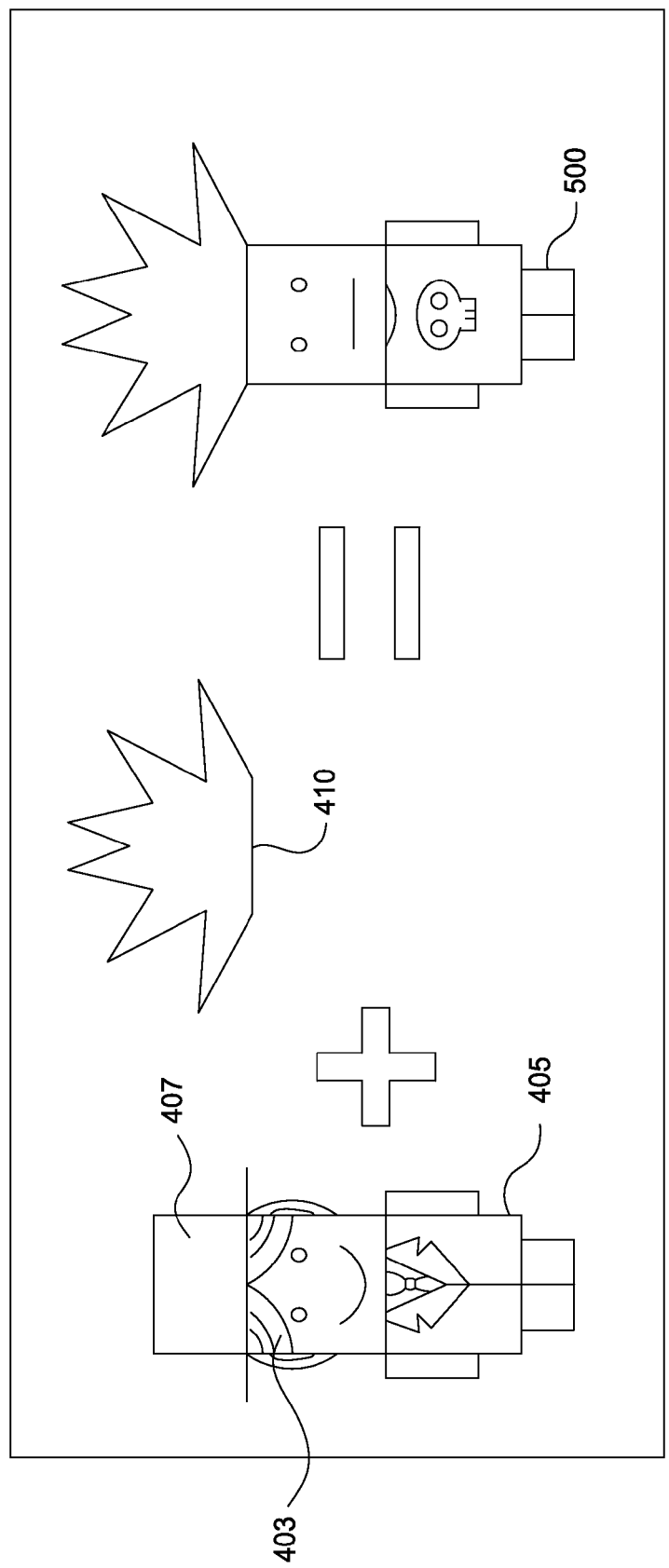
Figure 6:
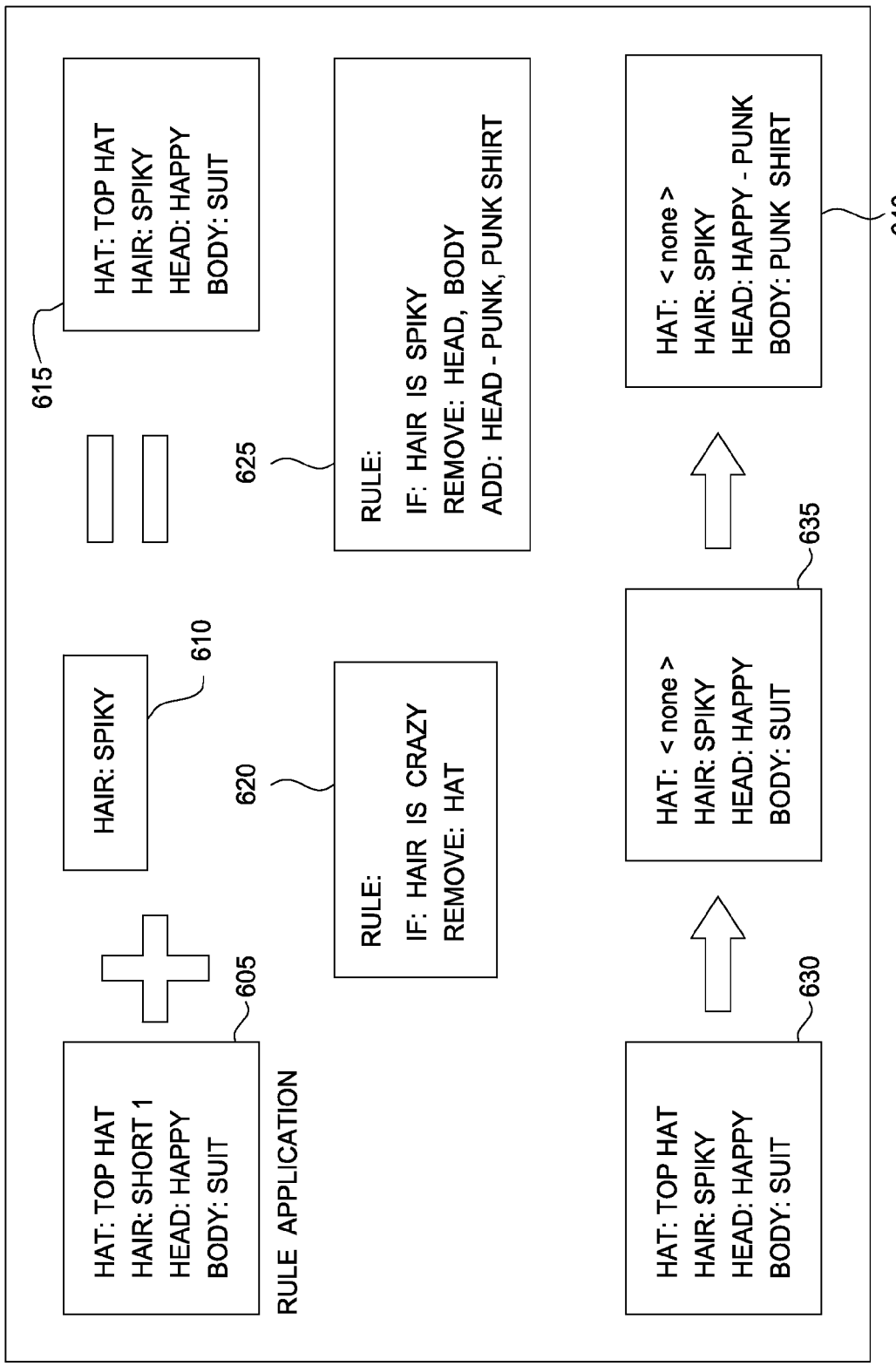

FIG. 4-6 illustrates an example of exclude override rules applied to user selections in customizable characters, according to one embodiment of the invention. FIG. 4 shows an example of interpretation effects that can result from character customization choices. As shown, a user selects to add spiky hair 410 to an existing set of customizations made to character 405. Specifically, character 405 includes a hat 407 and a suit 409. Additionally, the character has a hairstyle 413. In this example, the user customizes the character 405 by replacing the hairstyle 413 with spiky hair 410, resulting in modified character modified $405_1$.

If no rules were enforced, the addition of spiky hair 410 results in a character $405_1$ that has a hat with spiky hair sticking out of it. That is, the combination of the hat 407 and the spiky hair 410 results in rendering interpenetration, where the spiky hair appears to stick out through the hat worn by character $405_1$. Graphically, this is undesirable. Accordingly, in one embodiment, the exclude override rules may modify the appearance of the character based on the addition of spiky hair 410.

FIG. 5 shows the results of applying an exclude override rule to the user's selection to add spiky hair 410. As shown, when the user adds the spiky hair 410 to the model 405, the exclude override rule is used to make other changes to the model 405 to enforce a predefined aesthetic. In our example, the aesthetic is to remove the hat 407, change the head as well as change the body of the character 405. Doing so results character 500, where the hair style 410 replaces the hair 403. However, character 500 also includes changes that remove of the hat 407 and the changes to the face and clothing worn by character 405. Again note, the underlying model definition still includes the hat 407, hair 403 and body and suit of character 405. However, the addition of the spiky hair 410 has resulted in the application of an exclude override rule which modifies these elements, resulting in character 500. Should the user remove the spiky hair 410, from the character 500, the model would revert to the appearance of character 405.

FIG. 6 illustrates an example of two exclude override rules 620, 625 being applied to a model definition 605. Model definition 605 corresponds to character model 405, but shows a list of customized items instead of the rendered appearance of the character. Specially, model definition 605 includes a HAT, HAIR, HEAD, and BODY items set to TOP HAT, SHORT1, HAPPY, and SUIT, respectively. Additionally, the selection of "HAIR:SPIKY" 610 is shown being added to the model definition 605, resulting in model definition 615.

As shown at the top part of FIG. 6, when the user selects to add the HAIR:SPIKY 610 item to the model definition 605, it simply replaces the previous value for the HAIR selection, resulting in model definition 615. Then, to determine what model items to use to composite the appearance of the character presented to the user, the exclude override rules are processed against the model definition 615. As noted, the exclude override rules allow for wildcard values, removing the need to specify every possible permutation of a give rule.

In this example, a first rule 620 uses wildcards and specifies that if a model definition includes any HAIR that is categorized as CRAZY then any HAT in the model definition should be removed. Thus, as shown, the rule 620 is applied to model definition 630, resulting in model definition 635. Once the first rule 620 is applied, the HAT that is selected is now <none>.

Continuing with this example, a second rule 625 is applied to the model definition 635 to create model definition 640. However, the second rule 625 uses wildcards in a different way. First, rule 625 includes a condition indicating that this rule should be applied when the model HAIR is the specific HAIR item called SPIKY, and then specifies a wildcard value to replace the HEAD with the PUNK version of the head. In our example, the current HEAD value is HAPPY, so that gets updated to be to a variant of the head HAPPY-PUNK. This rule also replaces our BODY value with the specific BODY called PUNK SHIRT.

In one embodiment, when rules 620 and 625 are applied, they are applied to a temporary copy of the model definition so all of the original user selected choices remain. In this example, this means that a user could choose the SPIKY hairdo and have the other parts of the model definition change. However, at a later time, if the user changes the HAIR back to a hairstyle tagged as something other than CRAZY (which resulted in rule 620 being applied) hairdo, the HAT, HEAD, and BODY values selected by the user would again be used to present a character appearance to the user. This allows us to give precedence to the most recent user selections in spite of rules which may trump the user's selections.

Advantageously, the data driven rules system provides a powerful and valuable tool for helping to ensure a graphical and aesthetic result for user controlled customization in video games and other online or interactive environments. Since the rules are authored through data tagging, the rules do not require a programmer to create them. Further, tagging character items with metadata allows the use of wildcards in rules, resulting in a minimal number of rules to be required and rule overrides.

While the foregoing is directed to embodiments of the present invention, other and further embodiments of the invention may be devised without departing from the basic scope thereof, and the scope thereof is determined by the claims that follow.

What is claimed is:

1. A computer-implemented method for customizing the appearance of a digital object, the method comprising:
   receiving a modification to a then current model definition for the digital object;
   upon determining the then current model definition satisfies at least one exclude override rule, modifying a copy of the then current model definition, as specified by the exclude override rule, without modifying the then current model definition; and
   generating, by operation of a processor, a display of the digital object from the modified copy of the then current model definition.

2. The method of claim 1, further comprising:
   receiving an indication that a user has completed customizing the appearance of the digital object;
   retrieving the then current model definition for the digital object; and
   applying one or more configuration rules to the then current model definition to generate a final model definition.

3. The method of claim 2, further comprising:
   identifying a set of rendering assets from the final model definition used to render the digital object.

4. The method of claim 3, wherein the rendering assets include at least one of a texture and a mesh.

5. The method of claim 1, wherein the then current model definition includes a set of attributes describing the appearance of the digital object.

6. The method of claim 5, wherein modifying the copy of the then current model definition, as specified by the exclude override rule, comprises adding at least one item to the copy of the then current model definition.

7. The method of claim 5, wherein modifying the copy of the then current model definition, as specified by the exclude override rule, comprises removing at least item from the copy of the then current model definition.

8. The method of claim 1, wherein the then current model definition includes at least one non-visible attribute of the digital object.

9. The method of claim 1, wherein the digital object corresponds to a object in a video game.

10. The method of claim 1, wherein the exclude override rule specifies the modification to make to the copy of the then current model definition.

11. A non-transitory computer-readable storage medium storing code for execution by a central processing unit (CPU), wherein the code, when executed by the CPU, performs an operation for customizing the appearance of a digital object, the operation comprising:
receiving a modification to a then current model definition for the digital object;
upon determining the then current model definition satisfies at least one exclude override rule, modifying a copy of the then current model definition, as specified by the exclude override rule, without modifying the then current model definition; and
generating a display of the digital object from the modified copy of the then current model definition.

12. The non-transitory computer-readable storage medium of claim 11, wherein the operation further comprises:
receiving an indication that a user has completed customizing the appearance of the digital object;
retrieving the then current model definition for the digital object; and
applying one or more configuration rules to the then current model definition to generate a final model definition.

13. The non-transitory computer-readable storage medium of claim 12, wherein the operation further comprises:
identifying a set of rendering assets from the final model definition used to render the digital object.

14. The non-transitory computer-readable storage medium of claim 13, wherein the rendering assets include at least one of a texture and a mesh.

15. The non-transitory computer-readable storage medium of claim 11, wherein the then current model definition include a set of attributes describing the appearance of the digital object.

16. The non-transitory computer-readable storage medium of claim 15, wherein modifying the copy of the then current model definition, as specified by the exclude override rule, comprises adding at least one item to the copy of the then current model definition.

17. The non-transitory computer-readable storage medium of claim 15, wherein modifying the copy of the then current model definition, as specified by the exclude override rule, comprises removing at least item from the copy of the then current model definition.

18. The non-transitory computer-readable storage medium of claim 11, wherein the then current model definition includes at least one non-visible attribute of the digital object.

19. A system, comprising:
one or more computer processors; and
a memory containing a program, which when executed by the one or more computer processors is configured to perform an operation for customizing the appearance of a digital object, the operation comprising:
receiving a modification to a then current model definition for the digital object,
upon determining the then current model definition satisfies at least one exclude override rule, modifying a copy of the then current model definition, as specified by the exclude override rule, without modifying the then current model definition, and
generating a display of the digital object from the modified copy of the then current model definition.

20. The system of claim 19, wherein the operation further comprises:
receiving an indication that a user has completed customizing the appearance of the digital object;
retrieving the then current model definition for the digital object; and
applying one or more configuration rules to the then current model definition to generate a final model definition.

21. The system of claim 20, wherein the operation further comprises:
identifying a set of rendering assets from the final model definition used to render the digital object.

22. The system of claim 21, wherein the rendering assets include at least one of a texture and a mesh.

23. The system of claim 19, wherein the then current model definition includes a set of attributes describing the appearance of the digital object.

24. The system of claim 23, wherein modifying the copy of the then current model definition, as specified by the exclude override rule, comprises adding at least one item to the copy of the then current model definition.

25. The system of claim 23, wherein modifying the copy of the then current model definition, as specified by the exclude override rule, comprises removing at least item from the copy of the then current model definition.

26. The system of claim 19, wherein the then current model definition includes at least one non-visible attribute of the digital object.

27. A method for customizing an object in a video game system, the method comprising:
receiving a first set of object attributes;
receiving a set of rules, wherein the rules are configured to maintain a predefined object aesthetic;
receiving a set of wildcards, wherein the wildcards are configured responsive to the rules to generate at least one object customization combination that maintains the object aesthetic;
receiving a user's selection of object attributes for a target object configuration; and
in response to the user selection, by operation of a processor, revising the user selection with at least one of the rules and one of the wildcards to derive a second set of object attributes from the first set of object attributes, wherein the second set of object attributes maintains the predefined object aesthetic within a predefined threshold while approximating the user target object configuration.

* * * * *